United States Patent [19]
Bakula et al.

[11] Patent Number: 5,673,797
[45] Date of Patent: Oct. 7, 1997

[54] SCREEN ASSEMBLY FOR VIBRATORY SCREENING MACHINE AND METHOD OF FABRICATION THEREOF

[75] Inventors: John J. Bakula, Grand Island; Keith F. Wojciechowski, Lakeview, both of N.Y.

[73] Assignee: Derrick Manufacturing Corporation, Buffalo, N.Y.

[21] Appl. No.: 412,685

[22] Filed: Mar. 29, 1995

[51] Int. Cl.$^6$ ............................................... B07B 1/49
[52] U.S. Cl. ...................................... 209/392; 209/403
[58] Field of Search ............................ 209/392, 403, 209/400

[56] References Cited

U.S. PATENT DOCUMENTS

| | | |
|---|---|---|
| 607,598 | 8/1898 | Closz . |
| 966,578 | 8/1910 | Murphy et al. . |
| 1,561,632 | 11/1925 | Woodward . |
| 1,999,769 | 4/1935 | Lincoln ............................ 209/403 |
| 2,314,879 | 3/1943 | Heller ............................. 209/403 |
| 2,315,055 | 3/1943 | Heller ............................. 209/400 |
| 3,101,314 | 8/1963 | Johnson ....................... 209/403 X |
| 3,968,033 | 7/1976 | Illemann et al. ................ 209/403 |
| 4,033,865 | 7/1977 | Derrick, Jr. ...................... 209/275 |
| 4,575,421 | 3/1986 | Derrick et al. .................. 209/397 |
| 4,819,809 | 4/1989 | Derrick .......................... 209/392 X |
| 4,820,407 | 4/1989 | Lilie ............................... 209/397 |
| 4,857,176 | 8/1989 | Derrick et al. .................. 209/392 |
| 5,221,008 | 6/1993 | Derrick, Jr. et al. ............. 209/269 |
| 5,330,057 | 7/1994 | Schiller et al. .................. 209/392 |
| 5,332,101 | 7/1994 | Bakula ........................... 209/403 |

OTHER PUBLICATIONS

See Attached Sheets and Exhibits A, B, C, D, E and F. (No Date).

*Primary Examiner*—D. Glenn Dayoan
*Attorney, Agent, or Firm*—Joseph P. Gastel

[57] ABSTRACT

A screen assembly for a vibratory screening machine including a plate having openings therein, a plurality of screens firmly bonded to the plate, channels on the edges of the plate, and a plurality of hollow plastic channeling strips fused into the plurality of screens. A method of fabricating a screen assembly for a vibratory screening machine including the steps of firmly bonding a plurality of screens to a plate having openings therein, laying a plurality of plastic tubes into grooves of a fixture, superimposing the plurality of screens bonded to the plate over the plastic tubes, and applying a heated platen to the plate and the screens bonded thereto to thereby cause the plastic tubes to fuse into the screens.

35 Claims, 3 Drawing Sheets

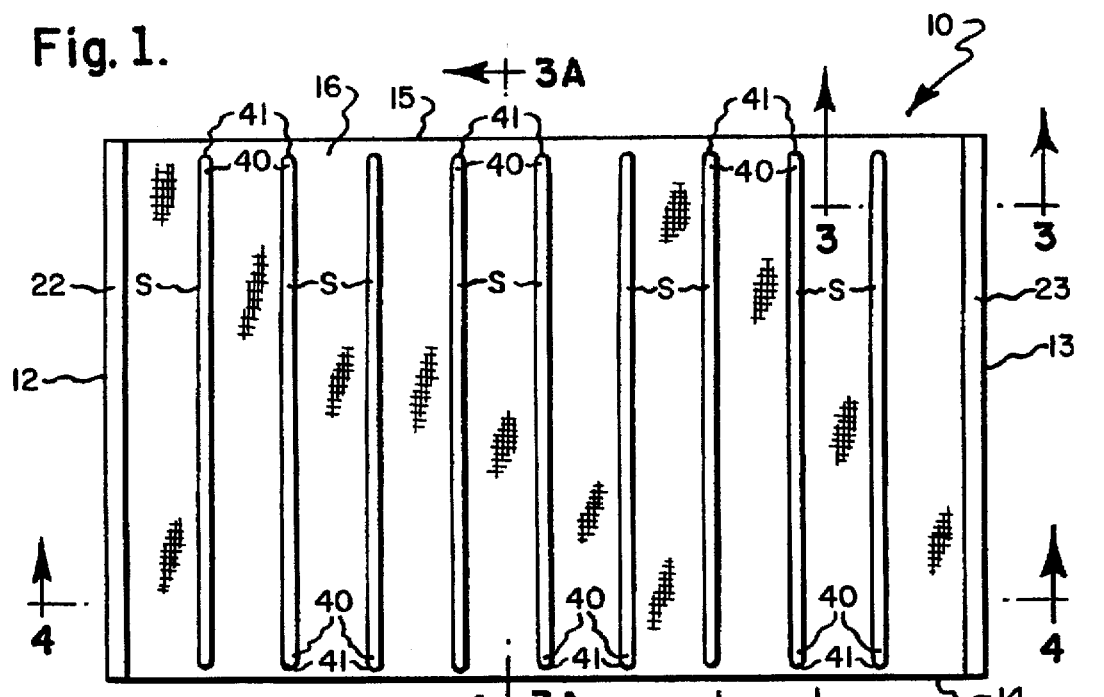
Fig. 1.
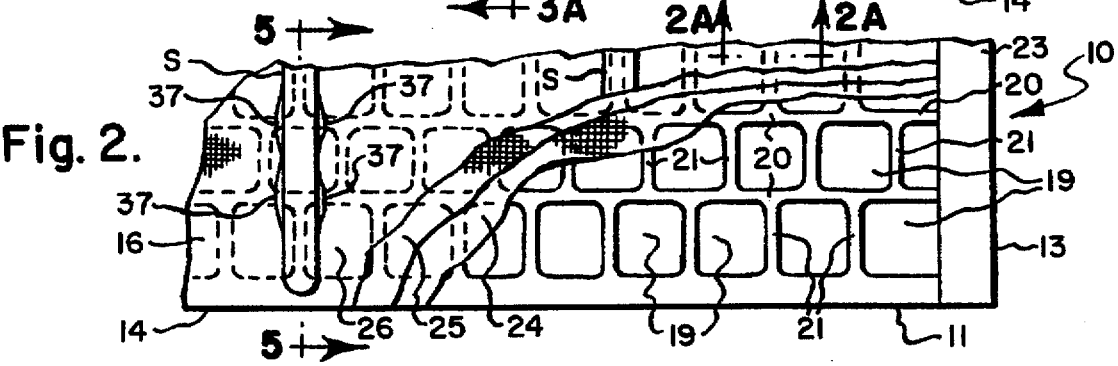
Fig. 2.
Fig. 2A.
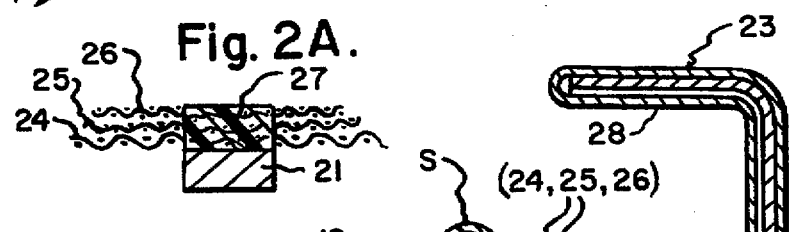
Fig. 3.
Fig. 3A.
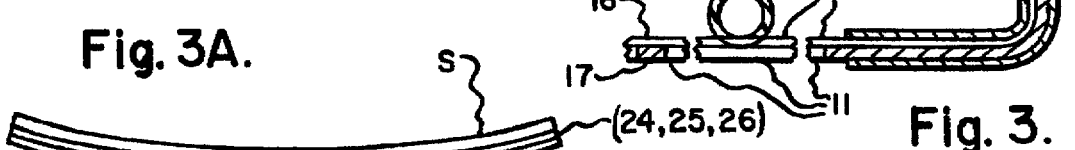
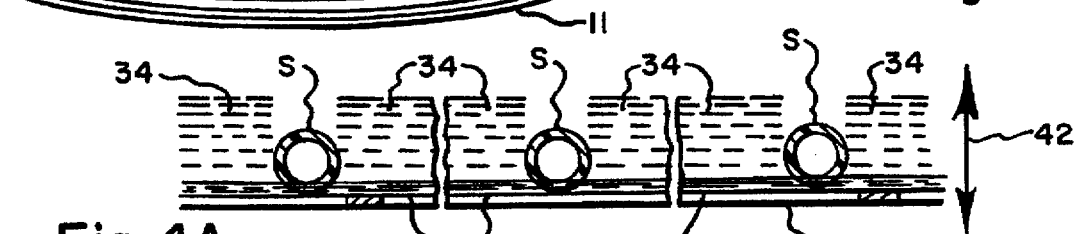
Fig. 4A.

5,673,797

1

SCREEN ASSEMBLY FOR VIBRATORY SCREENING MACHINE AND METHOD OF FABRICATION THEREOF

BACKGROUND OF THE INVENTION

The present invention relates to an improved screen assembly having channeling strips thereon for channeling the flow of material during a vibratory screening operation and to a method of fabrication thereof.

By way of background, screening assemblies for use in vibratory screening machines are well known in the art. One type in common use is fully disclosed and described in U.S. Pat. No. 4,575,421. It is also known that screen assemblies having longitudinal strips of various types thereon have been used in the past to channel flow of materials in columns and to thus prevent the materials from migrating away from the center of the screen during vibration. It is with an improved screen of the foregoing type that the present invention is concerned.

SUMMARY OF THE INVENTION

It is one object of the present invention to provide an improved screen assembly for a vibratory screening machine which has unique channeling strips bonded thereto in an unique manner.

It is another object of the present invention to provide an improved method for fabricating a screen assembly having channeling strips bonded thereto. Other objects and attendant advantages of the present invention will readily be perceived hereafter.

The present invention relates to a screen assembly for a vibratory screening machine comprising a screening screen having an upper surface, longitudinal side edges on said screening screen, and a plurality of spaced elongated plastic strips extending longitudinally between said longitudinal edges and fused to said screen and extending above said upper surface.

The present invention also relates to a method of fabricating a screen assembly for a vibratory screening machine comprising the steps of providing a fixture having a plurality of grooves therein, laying a plurality of elongated plastic strips into said grooves, superimposing a screening screen over said tubes, and applying a heated platen to said screen to thereby cause said plastic strips to fuse into said screen.

The various aspects of the present invention will be more fully understood when the following portions of the specification are read in conjunction with the accompanying drawings wherein:

BRIEF DESCRIPTION OF THE DRAWINGS

FIG. 1 is a plan view of the improved screen assembly of the present invention;

FIG. 2 is an enlarged fragmentary plan view of the screen of FIG. 1;

FIG. 2A is a fragmentary cross sectional view taken substantially along line 2A—2A of FIG. 2;

FIG. 3 is a fragmentary enlarged cross sectional view taken substantially along line 3—3 of FIG. 1;

FIG. 3A is a schematic view taken substantially in the direction of arrows 3A—3A of FIG. 1 and showing the tendency of the screen assembly to bow when a mass of plastic is fused thereto;

Figure 5:
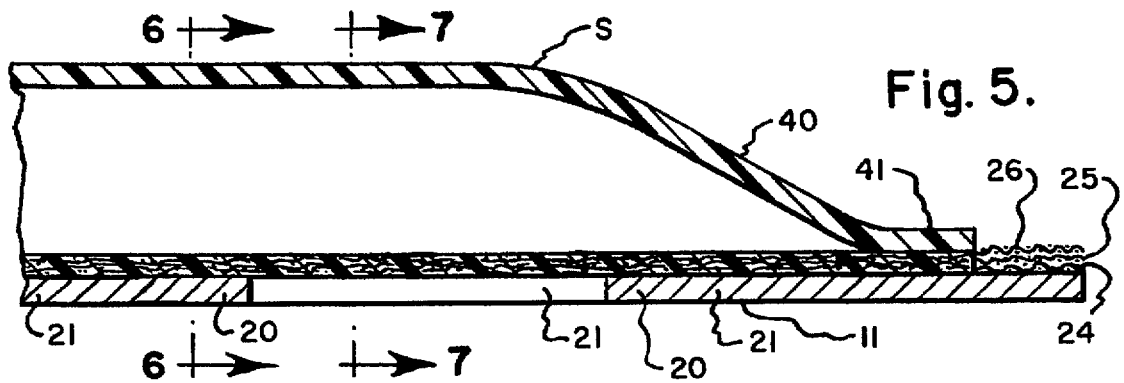
Figure 6:
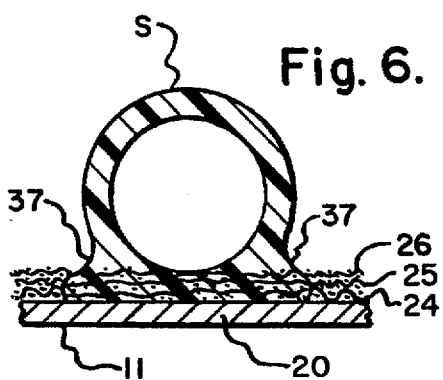
Figure 7:
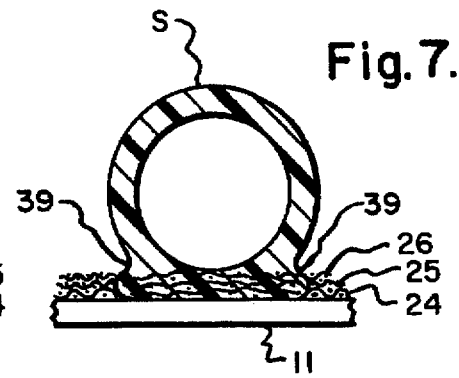
Figure 8:
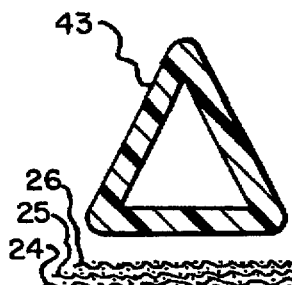
Figure 9:
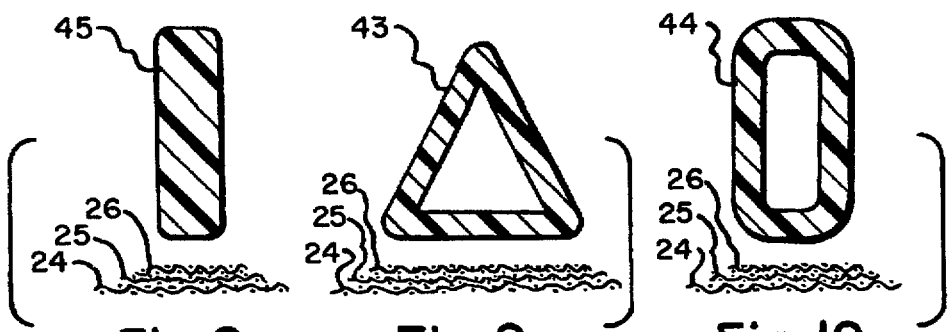
Figure 10:
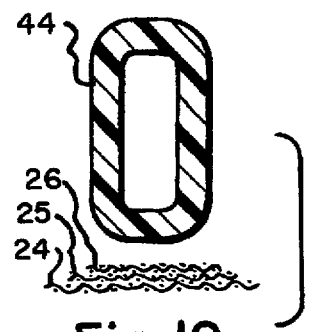
Figure 11:
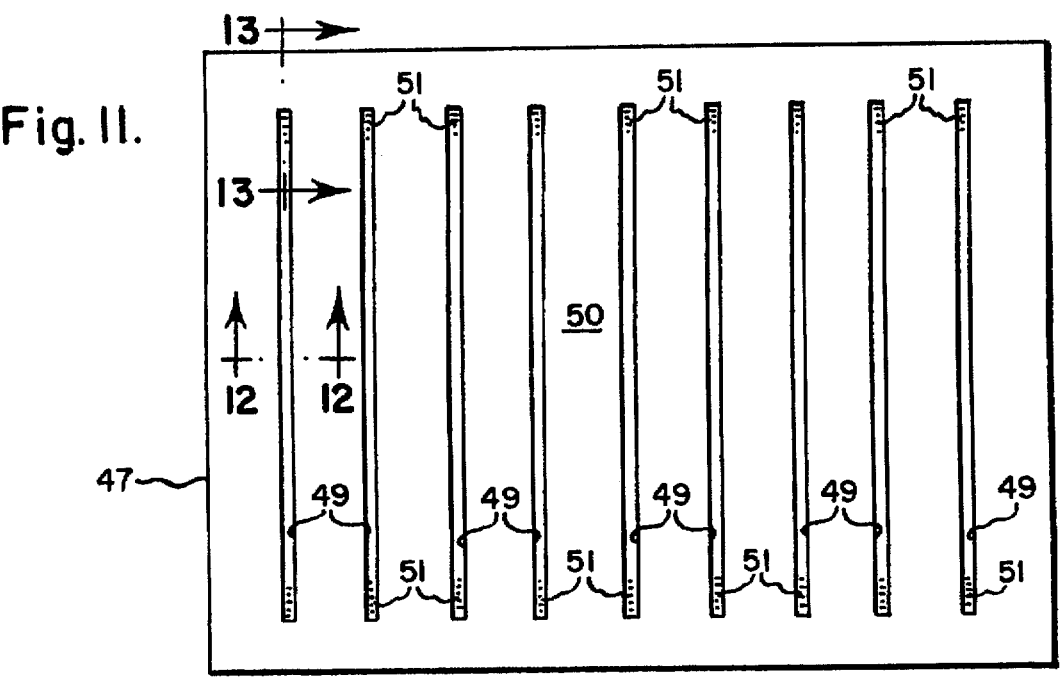
Figure 12:
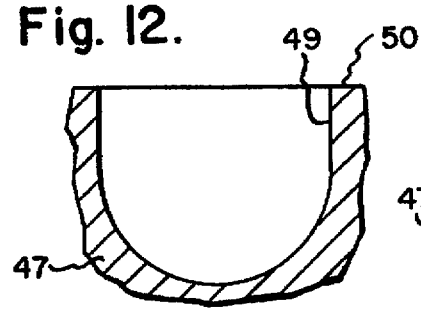
Figure 13:
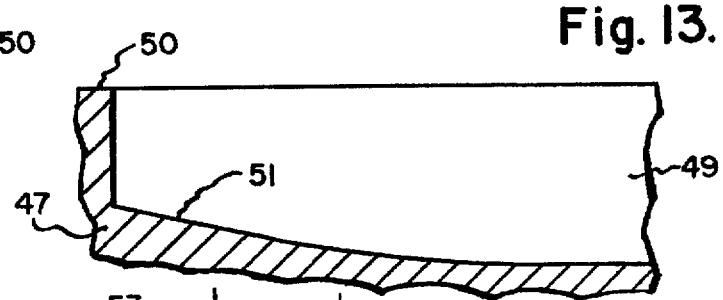
Figure 14:
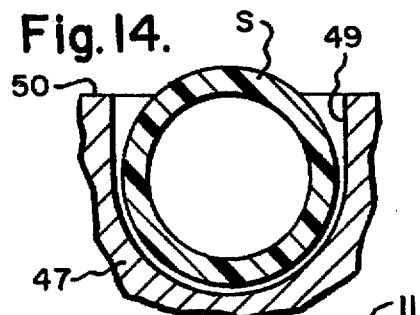
Figure 16:
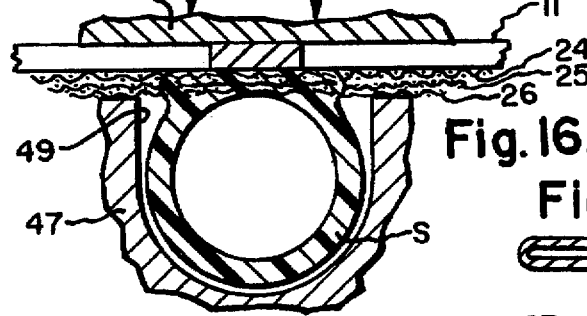
Figure 18:
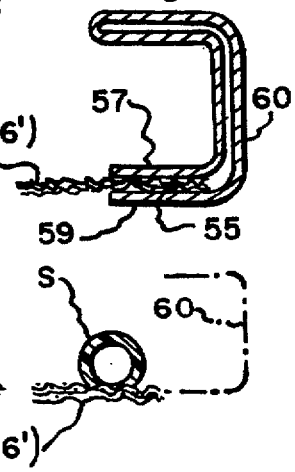
Figure 15:
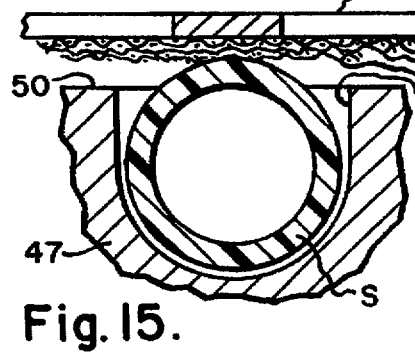
Figure 17:
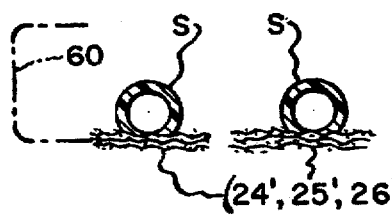

2 assembly of the present invention mounted on a vibratory screening machine;

FIG. 4A is a fragmentary schematic view showing the action of the screen assembly during vibration and the relationship of the material being screened thereto;

FIG. 5 is a greatly enlarged cross sectional view taken substantially along line 5—5 of FIG. 2 and showing the contour of the ends of the channeling strips;

FIG. 6 is a fragmentary cross sectional view taken substantially along line 6—6 of FIG. 5 and showing the channeling strip fused into the screen assembly;

FIG. 7 is a fragmentary cross sectional view taken substantially along line 7—7 of FIG. 5;

FIG. 8 is a cross sectional view showing another possible shape of channeling strip;

FIG. 9 is a cross sectional view showing still another possible shape of a channeling strip;

FIG. 10 is a cross sectional view showing yet another possible shape of a channeling strip;

FIG. 11 is a plan view of a fixture for fabricating the screen assembly of FIG. 1;

FIG. 12 is a fragmentary cross sectional view of the central portion of one of the grooves in the fixture;

FIG. 13 is an enlarged fragmentary cross sectional view of the end of the groove in the fixture;

FIG. 14 is a fragmentary cross sectional view showing a tube mounted in the groove of FIG. 12;

FIG. 15 is a fragmentary cross sectional view showing the screens bonded to the plate being superimposed over the fixture of FIG. 11 after the plastic tubes have been inserted in the latter;

FIG. 16 is a fragmentary schematic view showing a heated platen pressing the plate mounted screens into the plastic tubes mounted in the fixture of FIG. 11;

FIG. 17 is a partially schematic fragmentary cross sectional view of another embodiment of the present invention wherein the channeling strips are fused directly into screens which are not bonded to an apertured plate; and FIG. 18 is a fragmentary enlarged cross sectional view showing the edges of the screen assembly of FIG. 7 bonded into a channel member.

DESCRIPTION OF THE PREFERRED EMBODIMENTS

The screen assembly 10 of the present invention is a modification of the screen shown in U.S. Pat. No. 4,575,421, and it has a plurality of plastic channeling strips S fused to the surface thereof for the purpose of channeling the material being screened in rows substantially longitudinally across the screen.

The improved screen assembly 10 of the present invention includes a perforated metal plate 11, such as steel or any other suitable metal, having a first pair of opposite side edges 12 and 13 and a second pair of opposite end edges 14 and 15 and an upper surface 16 and a lower surface 17. Plate 11 includes openings 19 which are bordered by elongated metal strip-like portions 20 which extend from side edge 12 to side edge 13 and by staggered shorter strip-like portions 21 which extend lengthwise between end edges 14 and 15. The openings 19 are formed by a punching operation and are quadrangles of approximately one inch square with rounded corners, but they may be of any other desired shape or size. The dimensions of openings 19 should not be less than about one-half inch or greater than about four inches, and more preferably not greater than about two and one-half inches and most preferably not greater than about one inch. Strip-like portions 20 and 21 are approximately 1/10 inches wide, but they may be of any desired width. The length of plate 11 between side edges 12 and 13 may be approximately four feet and its width between edges 14 and 15 may be approximately 3 1/3 feet and it may have a thickness of about 1/16 of an inch. However, it will be appreciated that the size of plate 11 may vary as required to fit different machines. In a plate 11 which is about four feet in length, there will be about 35 openings 19 in each row between edges 12 and 13 when the openings are one inch square. Thus, the width of each opening is a small fraction of the length of the plate between edges 12 and 13. The same is true of the relationship between the height of openings 19 and the width of the plate between edges 14 and 15. Channel-shaped members 22 and 23 include portions formed integrally with plate 11 at side edges 12 and 13, respectively, and sheet metal binders 28 are formed on the channel members.

A coarse support screen 24 extends substantially entirely across upper surface 16. Screen 24 may be of between about 8 and 75 mesh, or any other suitable mesh. A first fine screening screen 25 extends over the entire coarse screen 24 and is in contiguous abutting relationship therewith. A second fine screening screen 26 extends across the entire upper surface of fine screen 25 and is in contiguous abutting relationship therewith. Coarse screen 24 is basically a support for the portions of screens 25 and 26 which overlie openings 19. Screens 24, 25 and 26 are secured to the elongated border portions 20 and 21 and to each other and by epoxy adhesive 27. However, other suitable equivalent adhesives or methods of bonding may be used. Thus, the borders of the portions of screens 24, 25 and 26 overlying each opening 19 are firmly adhesively bonded to the border portions formed by elongated strip-like portions 20 and 21. Screens 25 And 26 may be between 80 and 400 mesh, and preferably central screen 25 has openings which are approximately 20% larger than the openings of top screen 26 so that any particle passing through screen 26 will pass through screen 25. The border portions 20 and 21 can be seen through the screens when the screen assembly is viewed in plan. However, border portions 20 and 21 have been omitted from FIG. 1 for ease of illustration.

Figure 4:
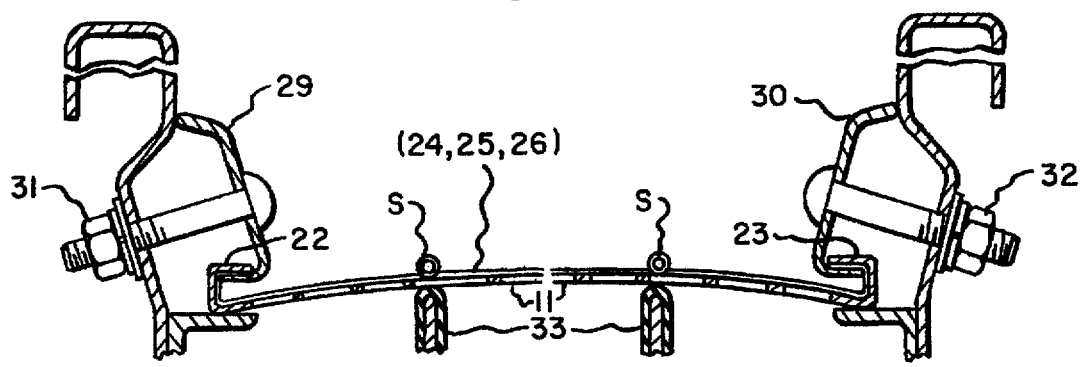
FIG. 4 is a fragmentary cross sectional view taken substantially along line 4—4 of FIG. 1 and showing the screen

Screen assembly 10 is mounted in a vibrating screening machine by means of elongated channel-shaped draw bars 29 and 30 which engage channels 22 and 23 as shown in FIG. 4 and are drawn up by means of nut and bolt assemblies 31 and 32, respectively, or other suitable tensioning means, as is well known in the art. Screen assembly 10 rests on a frame (not shown) having a plurality of elongated stringer members 33 extending longitudinally parallel to side edges 12 and 13 and supported at their opposite ends on the frame. In its operative position screen assembly 10 is bowed slightly so that its center along a line parallel to side edges 12 and 13 is higher than the outer edges 12 and 13, as is well known.

Screen assembly 10 may also be inclined downwardly or upwardly between upper edge 15 and lower edge 14 or it may be horizontal, as is well known. Material to be screened is fed onto screen assembly 10 at edge 15 and passes toward edge 14 as screen assembly 10 is vibrated in the conventional manner. As noted above, border portions 21 are staggered. The reason for this is that since the material to be screened is fed onto screen assembly 10 at end edge 15 and moves toward end edge 14, the staggering will prevent the material being screened from following the border portions 21 without passing over openings 19.

The foregoing description of a portion of screen assembly 10 is set forth in the above-mentioned prior U.S. Pat. No. 4,575,421.

In accordance with the present invention, a plurality of plastic channeling strips S are fused to the upper surface of the above-described screen and plate portion of screen assembly 10 for guiding material 34 (FIG. 4A) in rows as it passes from edge 15 toward edge 14. Channeling strips S extend longitudinally of side edges 12 and 13. At this point it is to be noted that plastic tubes S are oriented on screen assembly 10 so that when the screen assembly is mounted in a vibratory screening machine, each tube S will overlie an elongated stringer member 33 so that there will be no additional blocking of the screen openings in addition to the blocking produced by stringers 33. At this point it is to be noted that a conventional vibratory screening machine has nine stringers 33 and that the screen assembly 10 has nine channeling strips S, each of which overlies a stringer 33. It will be appreciated that there can be more or less than nine strips S depending on the structural requirements of the vibrating framework, that is, the number of stringers such as 33.

The plastic strips S, which are fused to the upper surface 16 of the screen assembly in the present instance are cylindrical polyethylene tubes which have their portions which are contiguous to the metal strips 21 fused into fillet-like shapes as at 37 (FIG. 6). The portions which cross only the screens are fused into them, as shown in FIG. 7 and there are small fillets 39 at the edges of the tubes S. The fillets 37 and 39 tend to prevent foreign material from packing the junctions between the tubes S and the adjacent portions of the screen assembly. The end portions 40 of strips S are tapered downwardly (FIG. 5) and merge into the upper screen 26 at 41 to thereby close the ends of the tubes S. However, if desired the open ends of the tubes may be plugged with a suitable material rather than tapering them to a closed condition.

Because of the fact that the tubes S fuse into the screen, they are firmly bonded thereto so that they can withstand the high G forces to which they are subjected in operation. As an incident to their vibration as depicted by arrow 42 in FIG. 4A, the material which is being screened will form columns even though the height of the material is higher than strips S.

At this point it is to be noted that a balance must be reached between the mass and height of each strip S to avoid the tendency for curving the plate and the screen. In this respect, if a solid plastic strip of sufficient mass is used, its inherent shrinkage after cooling will bow the plate 11 as depicted in schematic FIG. 3A. A slight amount of bowing is acceptable. However, an excessive amount of bowing is unacceptable. The slight amount of bowing can be straightened out when the screen assembly 10 is mounted as shown in FIG. 4. It has been found that the use of the hollow polyethylene tubes S will give sufficient height but they will have insufficient mass to bow the remainder of the screen assembly 10 excessively. Furthermore, the tubes S have to be sufficiently thick so that they will not melt down when subjected to the heat required to fuse them into the remainder of the screen assembly. In the present instance polyethylene tubes were used having a 3/8" outer diameter and a 1/4" inner diameter with a wall thickness of 1/16". While round polyethylene tubes have been depicted and have been used, it will be appreciated that other shapes can also be used satisfactorily, and such shapes may include the hollow triangular shape 43 of FIG. 9 and the hollow rectangular shape 44 of FIG. 10. In addition, there is no reason why a solid rectangular member, such as 45 of FIG. 8, cannot be used provided that it does not have sufficient strength resulting from its shrinkage so as to bow the screen excessively when it cools after having been heated. In this respect, it is contemplated that polyethylene rectangular bars ⅛" wide×½" high can be used with the remainder of the screen assembly having the above-described parameters. However, a hollow geometric shape is preferred inasmuch as it will not have the lateral distortion which may occur in a solid shape, such as shown in FIG. 8.

It is to be especially noted that the polyethylene plastic, as described above, has yieldability and resilience so that it can be stretched to a straight condition, even though it is slightly bowed. It will be appreciated that other suitable thermoplastic plastics may be used including but not limited to such plastics as polypropylene and polyurethane.

The method of fabricating the screen assembly 10, which was described with respect to FIGS. 1–7, is depicted in FIGS. 11–16. In this respect, the subassembly of the plate and its screens 24, 25 and 26 is initially fabricated by bonding the three screens to the plate 11 by epoxy. This technique is well known in the art and it merely comprises coating the plate 11 with epoxy and thereafter pressing the three screens to it until the epoxy hardens and thereafter bending the edges of the plate 11 into channels 23.

In order to bond the tubes or channeling strips S to the remainder of the screen assembly 10, a fixture 47 is provided having nine grooves 49 therein. Each groove 49 receives a straight tube S which has an outer diameter of ⅜ inch and an inner diameter of ¼ inch. The grooves are approximately 9/32" deep, leaving 3/32" of each tube protruding above top 50. The ends of grooves 49 taper upwardly, as shown at 51 (FIG. 13), so that when the tubes S are therein, the end portions will lie ⅛" higher than the central portions of the tubes.

After the tubes S have been placed into the grooves 49, the plate 11 and the screens 24, 25 and 26 bonded thereto are inverted over fixture 47, as schematically depicted in FIG. 15. Thereafter, a heated platen 53 (FIG. 16) is pressed downwardly on plate 11 and the screens bonded thereto. This will cause the portions of tubes S which are contiguous to the screen assembly 11 to melt and fuse into screens 24, 25 and 26. The end portions 40 of tubes S will taper downwardly, as shown in FIG. 5, in view of the fact that the ends 51 of fixture 47 are shaped as shown at 51 in FIG. 13. It is to be especially noted that the fusing of tubes S into the screens 24, 25 and 26 and the fusing of the tubes S to the underlying metal portions 20 and 21 of plate 11 greatly strengthens the screen assembly, in addition to providing the channeling strips S.

In FIGS. 17 and 18 an alternate embodiment of the present invention is disclosed wherein the tubes S are fused into and bonded to a plurality of screens 24', 25' and 26' which are analogous to screens 24, 25 and 26, respectively, of the preceding figures, and which have their edges 55 clamped between the ends 57 and 59 of channel portions 60. The only difference between the embodiment of the preceding figures and FIGS. 17 and 18 is that the latter do not have a plate 11 to which the screens are actually bonded. However, the tubes S can be fused into screens which are not bonded to a plate because on cooling, the tubes S will not shrink appreciably so as to excessively bow the screens. Aside from the fact that the embodiment of FIGS. 17 and 18 does not have a plate, its mode of fabrication is the same as that of screen assembly 10, as described above relative to FIGS. 11–16.

The above description has disclosed different screen arrangements of screening screens including an arrangement wherein a plurality of screens are bonded to an apertured plate and wherein a plurality of screens are used without being bonded to an apertured plate. It will be appreciated that the term screening screen as used in the claims not only covers the foregoing arrangements but also any other arrangement of one or more screens used for screening to which a plastic channeling strip can be bonded by fusion.

It will also be appreciated that while channels have been disclosed for mounting the screen assembly in a screening machine, other types of mounting arrangements can be used for different types of machines, considering that the channeling strip aspect of the present invention is independent of the screen assembly mounting structure.

While preferred embodiments of the present invention have been disclosed, it will be appreciated that it is not limited thereto but may be otherwise embodied within the scope of the following claims.

What is claimed is:

1. A screen assembly for a vibratory screening machine comprising a screening screen having an upper surface, longitudinal side edges on said screening screen, and a plurality of hollow plastic channeling strips extending longitudinally between said longitudinal edges and fused to said screening screen and extending above said upper surface.

2. A screen assembly for a vibratory screening machine as set forth in claim 1 wherein said plastic channeling strips are substantially cylindrical.

3. A screen assembly for a vibratory screening machine as set forth in claim 1 wherein said plastic channeling strips have at least one end which is tapered downwardly.

4. A screen assembly for a vibratory screening machine as set forth in claim 1 wherein said plastic channeling strips have ends which are tapered downwardly.

5. A screen assembly for a vibratory screening machine as set forth in claim 1 including a plate, openings in said plate, border portions on said plate surrounding said openings, and said screening screen being firmly bonded to said border portions.

6. A screen assembly for a vibratory screening machine as set forth in claim 3 wherein said at least one end of said plastic channeling strips is closed.

7. A screen assembly for a vibratory screening machine as set forth in claim 6 including fillets at the junctions between said hollow tubes and adjacent portions of said screening screen.

8. A screen assembly for a vibratory screening machine as set forth in claim 1 including fillets at the junctions between said hollow tubes and adjacent portions of said screening screen.

9. In a vibratory screening machine having a frame and a plurality of stringers extending longitudinally on said frame for supporting a screen assembly, a screen assembly comprising a screening screen, longitudinal edges on said screening screen, channels on said longitudinal edges for securing said screening screen in a vibratory screening machine, and a plurality of hollow plastic channeling strips extending longitudinally between said longitudinal edges and fused to said screening screen and extending above said screening screen, each of said channeling strips extending longitudinally of and overlying an adjacent one of said stringers.

10. A screen assembly for a vibratory screening machine as set forth in claim 9 wherein said plastic channeling strips are substantially cylindrical.

11. A screen assembly for a vibratory screening machine as set forth in claim 9 wherein said plastic channeling strips have at least one end which is tapered downwardly.

12. A screen assembly for a vibratory screening machine as set forth in claim 9 wherein said plastic channeling strips have ends which are tapered downwardly.

13. A screen assembly for a vibratory screening machine comprising a screening screen having an upper surface, longitudinal side edges on said screening screen, and a plurality of plastic channeling strips extending longitudinally between said longitudinal edges and fused to said screening screen and extending above said upper surface, a plate, openings in said plate, border portions on said plate surrounding said openings, said screening screen being firmly bonded to said border portions, and said plurality of plastic channeling strips being fused to said border portions.

14. A screen assembly for a vibratory screening machine as set forth in claim 13 wherein said plastic channeling strips are hollow.

15. A screen assembly for a vibratory screening machine as set forth in claim 14 wherein said plastic channeling strips are substantially cylindrical.

16. A screen assembly for a vibratory screening machine as set forth in claim 14 wherein said plastic channeling strips have at least one end which is tapered downwardly.

17. A screen assembly for a vibratory screening machine as set forth in claim 14 wherein said plastic channeling strips have ends which are tapered downwardly.

18. A screen assembly for a vibratory screening machine as set forth in claim 16 wherein said at least one end of said plastic channeling strips is closed.

19. A screen assembly for a vibratory screening machine as set forth in claim 18 including fillets at the junctions between said plastic channeling strips and said screening screen and said border portions on said plate.

20. A screen assembly for a vibratory screening machine as set forth in claim 13 including fillets at the junctions between said plastic channeling strips and said screening screen and said border portions on said plate.

21. A screen assembly for a vibratory screening machine as set forth in claim 14 including fillets at the junctions between said plastic channeling strips and said screening screen and said border portions on said plate.

22. A screen assembly for a vibratory screening machine comprising a screening screen having an upper surface, longitudinal side edges on said screening screen, and a plurality of plastic channeling strips extending longitudinally between said longitudinal edges and fused to said screening screen and extending above said upper surface, said screening screen comprising a plurality of superimposed screens, and said plurality of plastic channeling strips being fused to said plurality of superimposed screens.

23. A screen assembly for a vibratory screening machine as set forth in claim 22 wherein said plastic channeling strips are hollow.

24. A screen assembly for a vibratory screening machine as set forth in claim 23 wherein said plastic channeling strips are substantially cylindrical.

25. A screen assembly for a vibratory screening machine as set forth in claim 23 wherein said plastic channeling strips have at least one end which is tapered downwardly.

26. A screen assembly for a vibratory screening machine as set forth in claim 23 wherein said plastic channeling strips have ends which are tapered downwardly.

27. A screen assembly for a vibratory screening machine as set forth in claim 22 including a plate, openings in said plate, border portions on said plate surrounding said openings, and said plurality of said screening screens being firmly bonded to said border portions.

28. A screen assembly for a vibratory screening machine as set forth in claim 27 wherein said plastic channeling strips are hollow.

29. A screen assembly for a vibratory screening machine as set forth in claim 28 wherein said plastic channeling strips are substantially cylindrical.

30. A screen assembly for a vibratory screening machine as set forth in claim 27 wherein said plastic channeling strips have at least one end which is tapered downwardly.

31. A screen assembly for a vibratory screening machine as set forth in claim 27 wherein said plastic channeling strips have ends which are tapered downwardly.

32. A screen assembly for a vibratory screening machine as set forth in claim 25 wherein said at least one end of said plastic channeling strips is closed.

33. A screen assembly for a vibratory screening machine as set forth in claim 32 including fillets at the junctions between said channeling strips and said plurality of superimposed screens.

34. A screen assembly for a vibratory screening machine as set forth in claim 32 including fillets at the junctions between said channeling strips and said plurality of superimposed screens.

35. A screen assembly for a vibratory screening machine, as set forth in claim 23 including fillets at the junctions between said channeling strips and said plurality of superimposed screens.

* * * * *

UNITED STATES PATENT AND TRADEMARK OFFICE
CERTIFICATE OF CORRECTION

PATENT NO. : 5,673,797
DATED : October 7, 1997
INVENTOR(S) : John J. Bakula et al It is certified that error appears in the above-indentified patent and that said Letters Patent is hereby corrected as shown below:

Column 8, line 40 (claim 34), change "32" to --22--.

Signed and Sealed this

Sixteenth Day of December, 1997

Attest:

BRUCE LEHMAN

*Attesting Officer*  *Commissioner of Patents and Trademarks*